United States Patent
Marotte et al.

(10) Patent No.: US 8,950,525 B2
(45) Date of Patent: Feb. 10, 2015

(54) FRONT POWER TAKEOFF FOR UTILITY VEHICLE

(71) Applicant: Clark Equipment Company, West Fargo, ND (US)

(72) Inventors: David E. Marotte, Litchfield, MN (US); Matthew R. Kettner, Litchfield, MN (US); Matthew J. Kaldor, Bismarck, ND (US); Anthony J. Kinsman, Wyoming, MN (US); David A. Elia, Anthem, AZ (US)

(73) Assignees: Clark Equipment Company, West Fargo, ND (US); Polaris Industries Inc., Medina, MN (US)

( * ) Notice: Subject to any disclaimer, the term of this patent is extended or adjusted under 35 U.S.C. 154(b) by 36 days.

(21) Appl. No.: 13/728,479

(22) Filed: Dec. 27, 2012

(65) Prior Publication Data
US 2014/0060219 A1  Mar. 6, 2014

Related U.S. Application Data

(60) Provisional application No. 61/696,534, filed on Sep. 4, 2012.

(51) Int. Cl.
*B60K 25/02* (2006.01)
*B60K 25/06* (2006.01)
(Continued)

(52) U.S. Cl.
CPC ............ *B60K 25/06* (2013.01); *B60K 17/28* (2013.01); *B60K 25/02* (2013.01); *F02B 63/06* (2013.01)
USPC ........................................ 180/53.7

(58) Field of Classification Search
CPC ........ B60K 25/02; B60K 25/06; B60K 17/28; F04B 17/05; F02B 63/06
USPC ................. 180/53.4, 53.7; 74/15.86
See application file for complete search history.

(56) References Cited

U.S. PATENT DOCUMENTS 1,481,816 A    1/1924  Tracy
1,858,700 A *  5/1932  Besonson ............... 192/48.8
2,024,551 A   12/1935  Thornhill
(Continued)

FOREIGN PATENT DOCUMENTS

DE    2359444       6/1975
EP    0291336      11/1988
EP    291336 A1 * 11/1988

OTHER PUBLICATIONS

Search Report and Written Opinion dated Oct. 16, 2013 issued in InternationalPatent Application No. 1PcT/US2012/071774 filed Dec. 27, 2012, 13 pages.

*Primary Examiner* — Paul N Dickson
*Assistant Examiner* — Robert A Coker
(74) *Attorney, Agent, or Firm* — John D. Veldhuis-Kroeze; Westman, Champlin & Koehler, P.A.

(57) ABSTRACT

Disclosed are power systems for use on various types of power machines, including an engine and a hydraulic pump assembly positioned in-line with and powered by an engine output shaft. A driving member powered by the engine has a central cavity through which access to the engine output shaft is provided to the hydraulic pump. A driven member is in communication with the driving member to receive power. The driven member is coupleable to a gearbox drive shaft that drives a gearbox, the gearbox having an output capable of driving a power take-off shaft.

18 Claims, 9 Drawing Sheets

(51) Int. Cl.
*B60K 17/28* (2006.01)
*F02B 63/06* (2006.01)

(56) References Cited

U.S. PATENT DOCUMENTS

| | | | |
|---|---|---|---|
| 2,250,754 A | 7/1941 | Dooley | |
| 2,399,733 A | 5/1946 | Hagen | |
| 2,450,080 A * | 9/1948 | Richey et al. | 74/15.63 |
| 2,614,396 A | 10/1952 | Ratermann | |
| 2,746,492 A | 5/1956 | De Hardit | |
| 2,815,590 A | 12/1957 | Fiacco | |
| 2,829,723 A | 4/1958 | Kelsey | |
| 3,055,127 A | 9/1962 | Williamson | |
| 3,371,543 A * | 3/1968 | Jackson et al. | 74/15.4 |
| 3,383,927 A | 5/1968 | Suchy | |
| 3,398,587 A | 8/1968 | Martin | |
| 3,483,763 A * | 12/1969 | Enters | 74/15.63 |
| RE27,177 E | 9/1971 | Schlapman et al. | |
| 3,759,340 A | 9/1973 | Schilter | |
| 3,828,878 A | 8/1974 | Clapsaddle, Jr. | |
| 3,927,954 A | 12/1975 | Walker | |
| 3,999,643 A | 12/1976 | Jones | |
| 4,317,500 A | 3/1982 | Bening | |
| 4,509,614 A | 4/1985 | Bando et al. | |
| 4,618,016 A | 10/1986 | van der Lely | |
| 4,640,378 A | 2/1987 | Dobberpuhl et al. | |
| 4,651,018 A | 3/1987 | Peterson, Jr. | |
| 4,662,472 A | 5/1987 | Christianson et al. | |
| 4,763,744 A | 8/1988 | McVicar et al. | |
| 4,825,790 A | 5/1989 | Strout | |
| 4,825,970 A | 5/1989 | McVicar et al. | |
| 4,974,711 A | 12/1990 | Peterson, Jr. et al. | |
| 5,040,615 A | 8/1991 | Fletcher | |
| 5,046,994 A * | 9/1991 | Hasegawa et al. | 475/83 |
| 5,094,309 A | 3/1992 | Vlaanderen et al. | |
| 5,156,232 A | 10/1992 | Muroya et al. | |
| 5,240,085 A | 8/1993 | Klossner et al. | |
| 5,346,018 A | 9/1994 | Koster | |
| 5,425,431 A | 6/1995 | Brandt et al. | |
| 5,476,150 A | 12/1995 | Hurlburt et al. | |
| 5,542,493 A | 8/1996 | Jacobson et al. | |
| 5,601,172 A | 2/1997 | Kale et al. | |
| 5,616,964 A | 4/1997 | Peterson, Jr. | |
| 5,755,098 A * | 5/1998 | Irikura | 60/435 |
| 5,873,224 A * | 2/1999 | Murakawa et al. | 56/11.4 |
| 6,089,340 A | 7/2000 | Galli | |
| 6,135,230 A | 10/2000 | Schenck et al. | |
| 6,186,260 B1 | 2/2001 | Schenck et al. | |
| 6,189,646 B1 | 2/2001 | Brandt et al. | |
| 6,237,708 B1 * | 5/2001 | Kawada | 180/53.7 |
| 6,359,245 B1 | 3/2002 | Wahls | |
| 6,533,053 B2 | 3/2003 | Hayden | |
| 6,626,053 B2 | 9/2003 | Baxter, Jr. et al. | |
| 6,742,290 B2 | 6/2004 | Hanafusa | |
| 6,830,116 B2 | 12/2004 | Ishimaru et al. | |
| 7,028,822 B2 | 4/2006 | Rush | |
| 7,140,830 B2 | 11/2006 | Berger et al. | |
| 7,337,866 B2 | 3/2008 | Nishi et al. | |
| 2002/0166712 A1 | 11/2002 | Ishimaru et al. | |
| 2003/0188913 A1* | 10/2003 | Ishimaru et al. | 180/337 |
| 2008/0271939 A1* | 11/2008 | Yasuda et al. | 180/308 |
| 2009/0308069 A1* | 12/2009 | Ohashi et al. | 60/486 |
| 2012/0055719 A1 | 3/2012 | Potter et al. | |

* cited by examiner

FRONT POWER TAKEOFF FOR UTILITY VEHICLE

CROSS-REFERENCE TO RELATED APPLICATION

This application claims the benefit of U.S. Provisional Patent Application 61/696,534 filed on Sep. 4, 2012, the contents of which are incorporated by reference into this application in their entirety.

BACKGROUND

Multi-purpose utility vehicles or power machines are known for their versatility in performing work functions. Many multi-purpose utility vehicles are capable of receiving implements on the front end thereof. Power takeoffs (PTOs), which are known in utility vehicles, are devices that are coupled to an engine and provide a rotational power source that can be coupled to an implement to power it.

The discussion above is merely provided for general background information and is not intended to be used as an aid in determining the scope of the claimed subject matter.

SUMMARY

Disclosed are utility vehicles or power machines, and power systems for use thereon, which provide a removeable power takeoff (PTO) mountable to a front end of the utility vehicle. An improved coupling between the PTO and a machine power supply such as an internal combustion engine results in a more compact mounting package.

In one embodiment, a power system for a power machine includes an engine capable of powering a rotatable output shaft and a hydraulic pump assembly positioned in-line with and powered by the engine output shaft. A driving member powered by the engine has a central cavity through which access to the engine output shaft is provided to the hydraulic pump. A driven member is in communication with the driving member to receive power, the driven member being coupleable to the gearbox drive shaft. An output of the gearbox drive shaft is capable of driving a power take-off shaft.

In another embodiment, a power system in a power machine provides the power machine with a front power take-off. The power system has an engine with an engine output shaft that drives a gearbox that is operably coupled to the engine output shaft. An output of the gearbox is capable of being coupled to and drive a power take-off shaft. The power take-off has an output shaft that is offset from the gearbox output.

This Summary is provided to introduce a selection of concepts in a simplified form that are further described below in the Detailed Description.

DRAWINGS

DETAILED DESCRIPTION

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The particular phrases and terminology used herein is for the purpose of description and should not be regarded as limiting. Words such as "including," "comprising," and "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
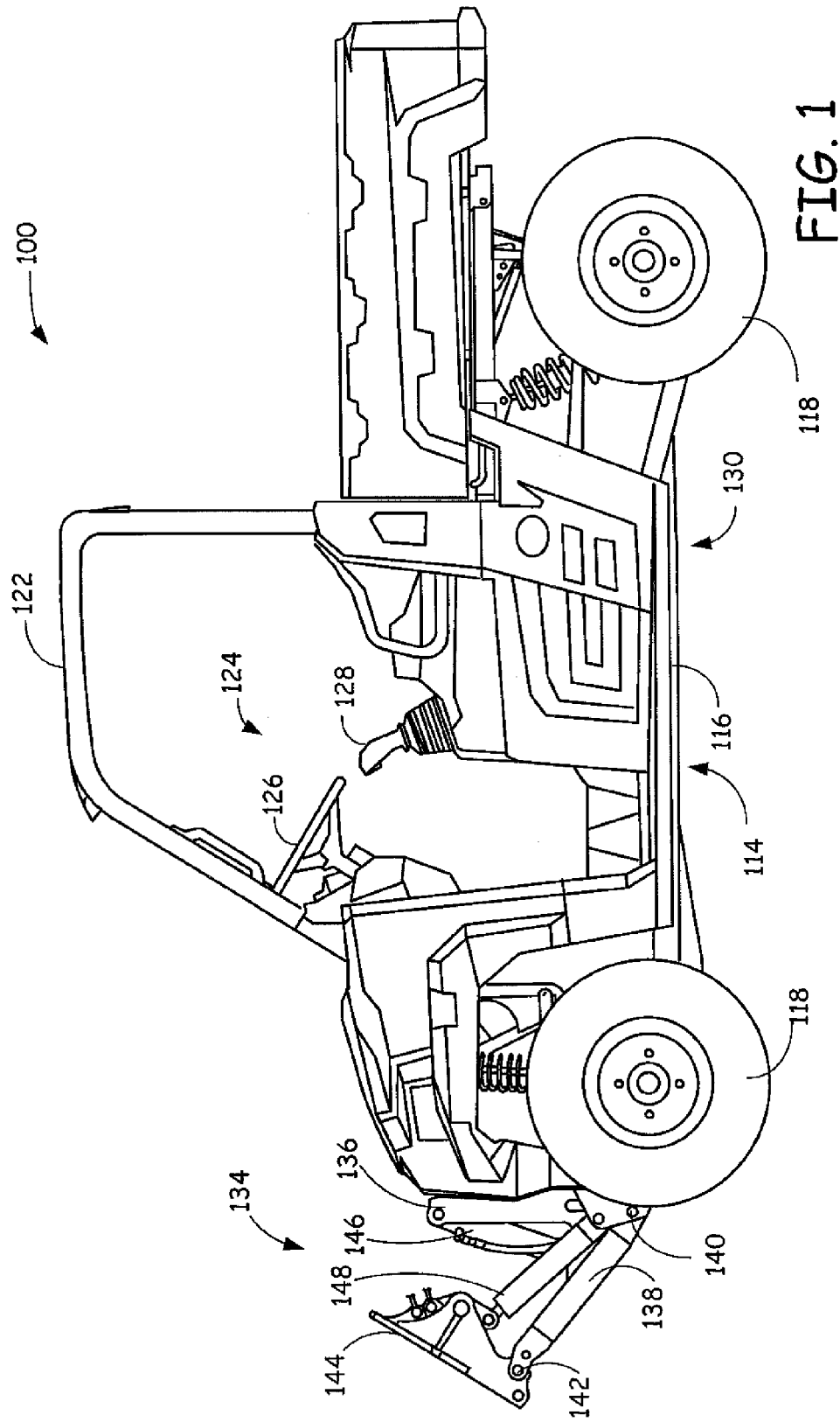
FIG. 1 is a left side view of a utility vehicle or power machine with a power takeoff (PTO) configured in accordance with disclosed embodiments.

A power machine 100 in the form of a utility vehicle is shown in FIG. 1 and is provided as one example of a type of power machine in which disclosed embodiments can be utilized. Other types of power machines on which the disclosed embodiments can be practiced include various types of loaders, excavators, telehandlers, and the like. Utility vehicle 100 includes a frame 114 having an undercarriage 116 supported for movement over the ground by front and rear pairs of tractive elements 118, which are illustratively shown in FIG. 1 as wheels, but can be other types of tractive elements such as powered tracks. An operator cab 122 that defines, at least in part, an operator compartment for carrying an operator, is mounted to the frame 114 and includes operator controls for controlling operation of the utility vehicle 100. Operator controls 124 are provided in the operator compartment for use by an operator to manipulate various operable systems on a utility vehicle. Examples of operator controls on utility vehicle 100 shown in FIG. 1 include a steering wheel 126 and a joystick 128. However, operator controls 124 can include any of a variety of different operator control device types such as foot pedals including those in the form of a treadle pedal, buttons, sliders, switches, touch sensitive display screens, rotatable devices that are incorporated into operator levers, handles, instrument panels, to name a few examples, and the illustrated operator controls 124 in the form of the steering wheel 126 and joystick 128 are shown to generally represent the various operator control types, but not to limit disclosed embodiments to specific types of operator controls.

An engine, represented generally at reference number 130, is mounted to the frame 114 and provides a power source for moving the wheels 118 and also for other systems. Additionally, the engine 130 provides a power source to various utility vehicle components. As discussed in greater detail with reference to FIGS. 2-5, engine 130 is capable of providing power to a front power takeoff (PTO) in exemplary disclosed embodiments. In some embodiments, the engine 130 is an internal combustion engine and in the case of the utility vehicle 100 shown in the figures is transversely mounted in the utility vehicle. Alternatively, the engine can be a hydraulic engine, an electric generator, or other types of engines, or in some cases, the engine can be a collection of one or more power sources, such as an internal combustion engine and an electric generator, such as can be found in so-called hybrid vehicles.

The utility vehicle 100 also includes a lift arm structure 134 mounted to the frame 114. Lift arm structure 134, in the illustrative embodiment, is removable from the utility vehicle 100 so that the utility vehicle can optionally be operated without the lift arm structure 134. In other embodiments of power machines, various different types of lift arm structures can be employed, including lift arm structures that are integral to the machine, that is, they are not intended to be optionally removed. In some cases, a utility vehicle may not have a lift arm.

Lift arm structure 134 includes a mounting frame 136 that is rigidly mounted to the utility vehicle when the lift arm structure 134 is attached to the utility vehicle. One or more lift arms 138 (only one lift arm is shown in FIG. 1) are pivotally coupled to the mounting frame 136 on a first end of the lift arm along at pivot joint 140. A variety of different arrangements of lift arms can be employed in a lift arm structure for utility vehicles, including multiple arms, cross members rigidly attached to each arm and the like. For the purposes of this discussion, the term lift arm 138 refers generally to any configuration of lift arms that might be attached to the mounting frame 136. An implement carrier 144 capable of carrying an implement (not shown) is pivotally coupled to a second end of the lift arm 138 at pivot joint 142. The implement carrier 144 is capable of receiving and securing any of a wide variety of implements including, as some examples, buckets, sweepers, push blades, push brooms, pallet forks, mowers, and snowblowers, to name just a few to the utility vehicle 100. One or more actuators 146 are pivotally coupled between the mounting frame 136 and the lift arm 138 for raising and lowering the lift arm 138 in response to manipulation of operator controls 124 by an operator to control the position of the lift arm. In some embodiments, hydraulic cylinders are used as lift arm actuators, although other types of actuators can be employed. One or more actuators 148 can also be included for performing various operator controlled functions such as rotating or tilting the implement carrier 144 with respect to the lift arms 138, thereby causing any implement attached to the implement carrier to similarly rotate or tilt. The one or more actuators 148 are illustratively pivotally attached to one of the lift arms 138 and the implement carrier 144 or, in the case of various embodiments that do not have an implement carrier, to the implement itself. Other user controlled functions can be performed as well, such as control of various functions on some implements. Implements that have power devices to accomplish various work functions, such as a motor for driving a cutting tool or a sweeper, to name a few examples, can be controlled by a user via operator controls 124. Many such implements are configured to engage with and be powered by a PTO to provide power to the power devices. Utility vehicle 100 also illustratively includes a PTO capable of engaging power devices on implements that have power devices configured to be powered by a PTO.

Figure 2:
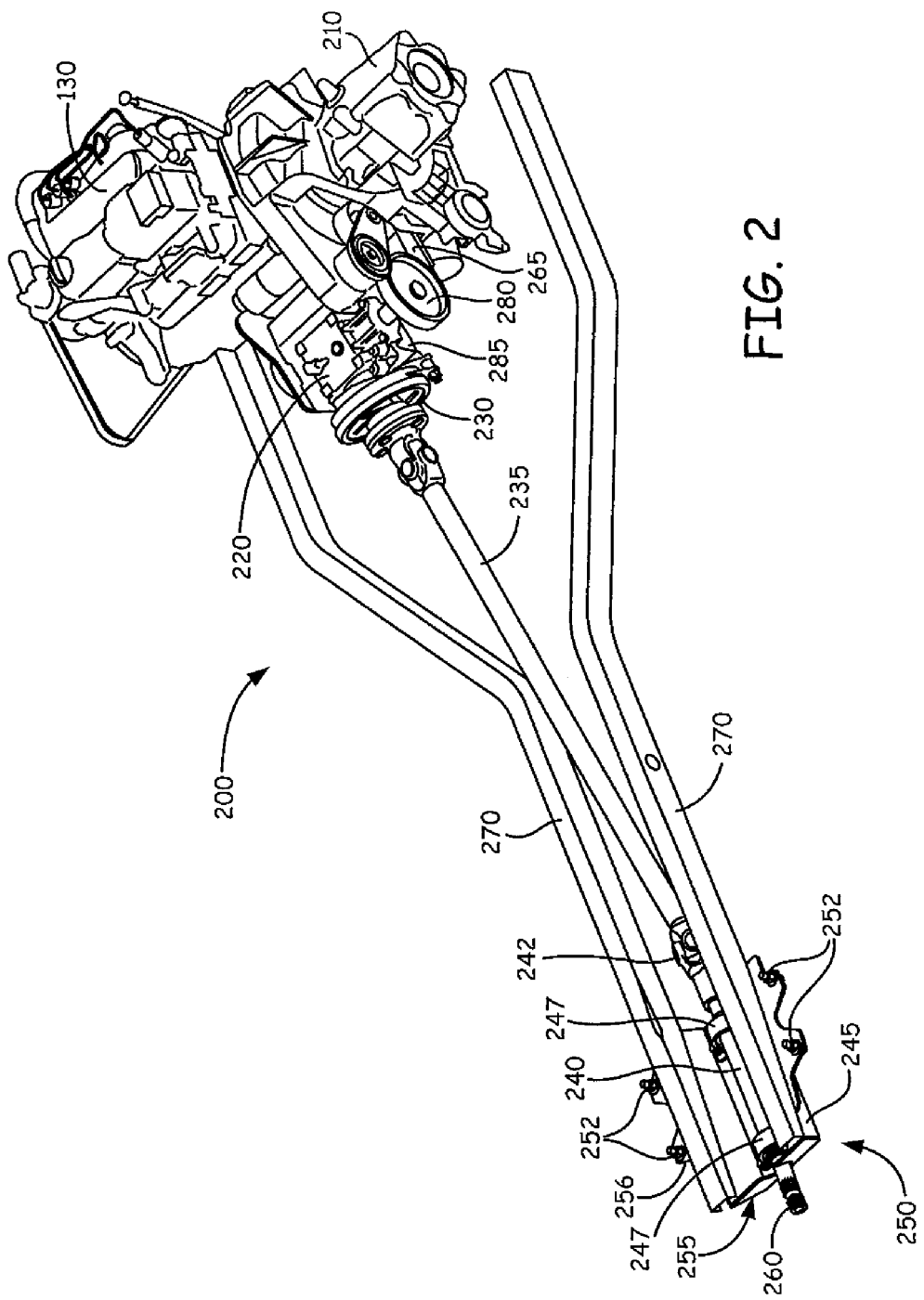
FIGS. 2-7 are illustrations of portions of a power system of the utility vehicle shown in FIG. 1 which provide an improved front PTO according to the illustrative embodiments.

Referring now to FIG. 2, a PTO 250 coupled to a power source 200 and mounted to a pair of frame rails 270 for utility vehicle 100 is illustrated. Power source 200 includes, in this exemplary embodiment, an engine 130 that is positioned transversely between frame rails 270, which run from a proximal to a distal end of the power machine 100. Engine 130 is mounted to frame members not shown in FIG. 2 so that the engine is positioned above the frame rails 270. A hydraulic pump assembly 210 is positioned inline with and coupled to an output shaft (not shown) of engine 130. The hydraulic pump assembly can include any number of hydraulic pumps in tandem, including variable displacement hydrostatic drive pumps, implement pumps and the like. For the purposes of this discussion, the hydraulic pump assembly 210 will be referred to collectively as a "hydraulic pump". A gear box 220, in some embodiment, a right angle gear box, although in other embodiments, other gearboxes can be employed, is operably coupled to the output shaft of the engine 130 via a belt driven pulley 280. An output of the gear box 220 is provided to a clutch 230. An output of the clutch 230 is provided to the PTO 250 and the clutch 230 is capable of being energized or de-energized in response to an operator input to control the activation of clutch 230.

The PTO 250 is attached to the clutch 230 on a first end and mounted beneath rails 270 on a second end. As discussed above, the engine 130 is mounted so that it sits above the rails 270. Since the second end of the PTO assembly 250 is mounted beneath the rails 270 and the output of clutch 230 is positioned above the rails 270, the PTO assembly 250 includes a first shaft 235 from the clutch 230 that descends from the clutch 230 to a second shaft 240 that is oriented generally parallel with the rails 270 and with respect to the utility vehicle 100. The first shaft 235 is coupled to the clutch through a first universal joint 232 and to the second shaft 240 through a second universal joint 242. The second shaft 240 is coupled to a housing 245 via a pair of bearings 247. In an exemplary embodiment, the bearings 247 are pillow bearings that accept the second shaft 240 and secure it to carrier 255, which includes housing 245. The housing 245 is mounted to undercarriage 116 of frame 114 of the utility vehicle 100 with bolts through flanges 256 of carrier 255. A PTO interface 260 is provided at the end of the second shaft 240. While the embodiments shown in FIG. 2 and discussed above disclose a clutch positioned between the gearbox output and the PTO shaft, in other embodiments, the clutch can be placed in other locations between the engine and the PTO shaft as may be advantageous.

Figure 3:
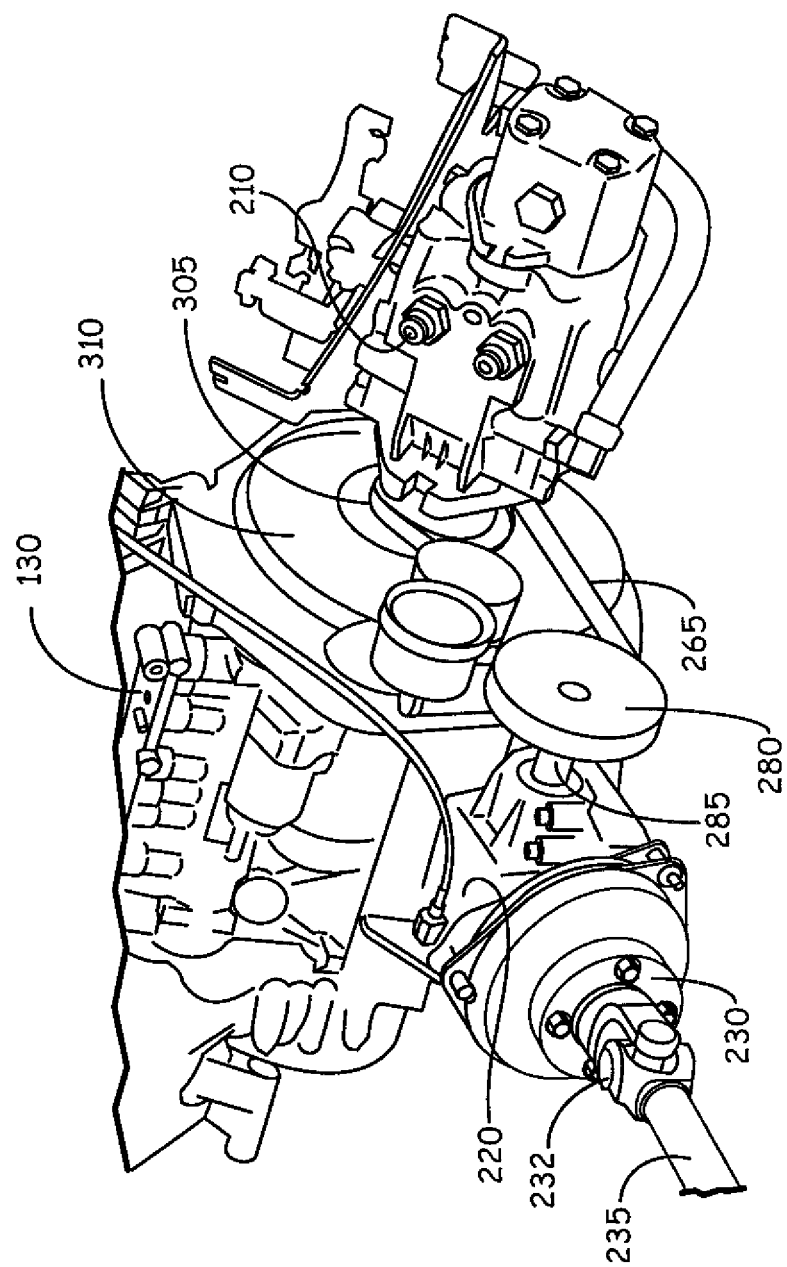

Referring now to both of FIGS. 2 and 3, shown in greater detail in the partial power source view of FIG. 3 is the coupling of the gearbox 220 and the engine 130. Hydraulic pump 210 is shown coupled to and aligned with the engine 130 so that it is directly driven by the engine output shaft, which is illustratively represented by reference number 505 in FIG. 5. The gear box 220 is driven by a belt 265 that engages a pulley 305, discussed in more detail below, which is operably coupled to and driven by the output shaft of the engine 130. Pulley 280 is rotated by belt 265 to rotate a gearbox drive shaft 285 to drive gearbox 220.

Figure 4:
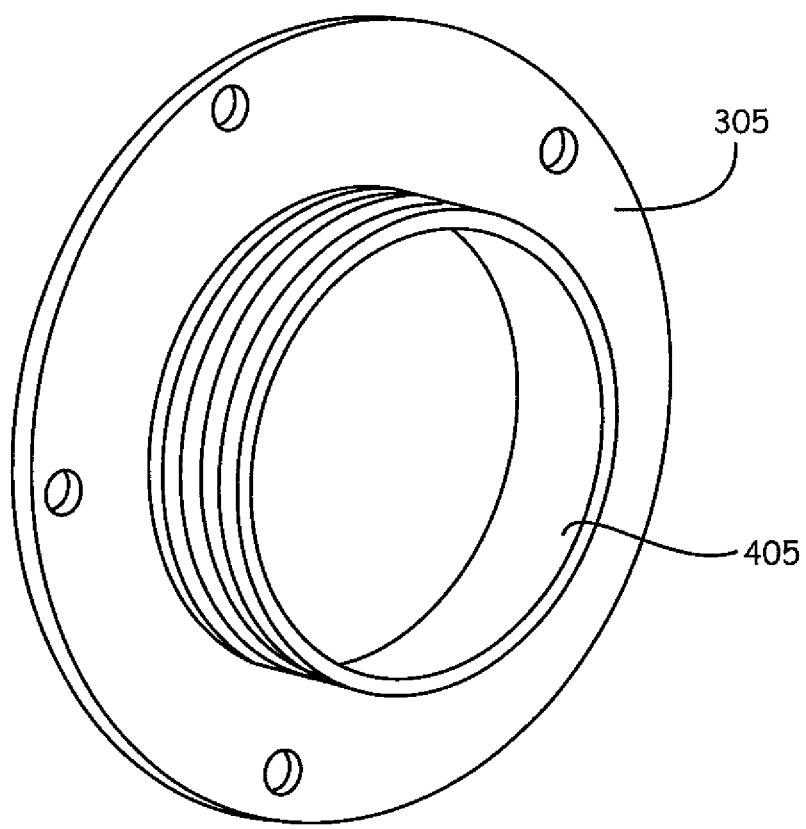

FIG. 4 shows pulley 305 in greater detail. Pulley 305 defines a center cavity 405 to accommodate the spline connection between the drive pump 210 and the engine 130. The pulley 305 is fixedly attached to a flywheel 310 (shown in FIGS. 3 and 5) and the rotational motion of the flywheel 310 drives pulley 305 and therefore gear box 220 via belt 265 and pulley 280. By fixedly attaching pulley 305 to the flywheel and providing a pulley 305 with the central cavity 405, precious little space is used to provide the drive mechanism to the drive structure for the PTO assembly. It should be appreciated that some utility vehicles may not be equipped with a PTO assembly initially. By providing a compact structure such as the pulley 305 for a driving mechanism, little space is used and the drive mechanism is still provided so that a PTO assembly can be easily added to the machine at a later date, should an owner of the machine choose to do so.

Figure 5:
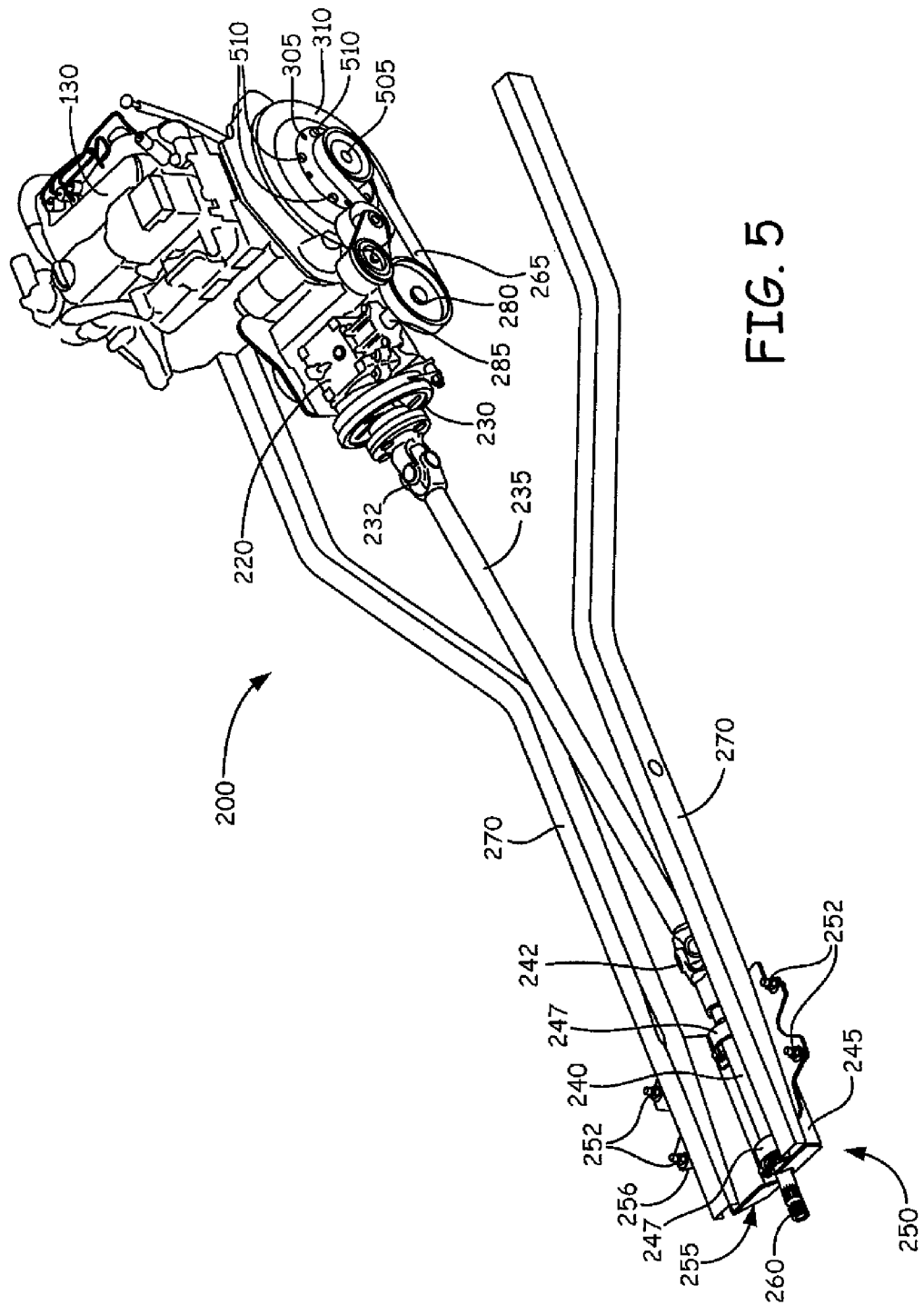
Figure 6:
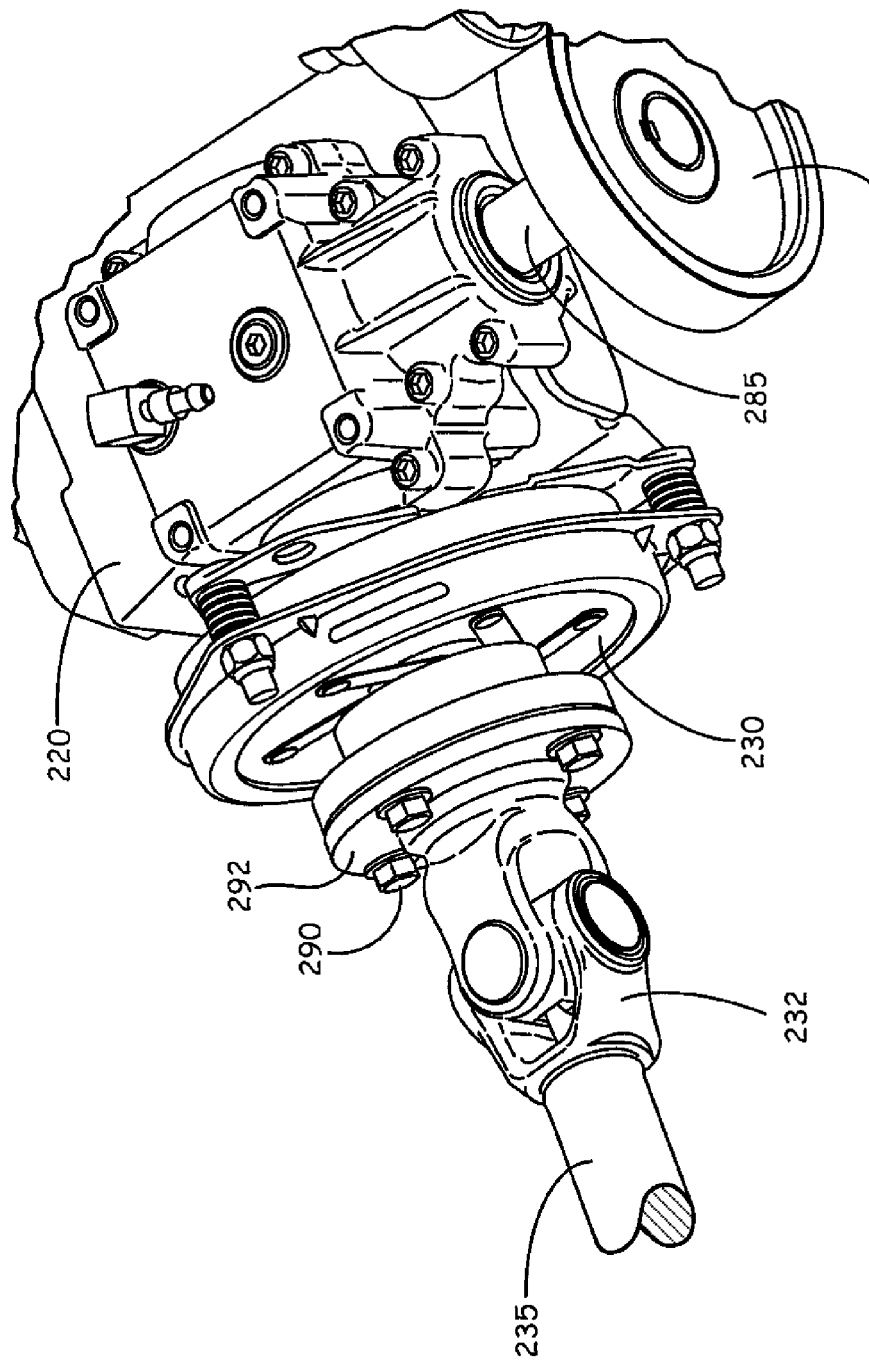

FIG. 5 illustrates the power source discussed with reference to FIGS. 2-4, but with the hydraulic drive pump 210 removed to show the pulley configuration in greater detail. As shown in FIG. 5, pulley 305 is mounted to flywheel 310 with bolts 510 or other suitable fasteners. In other embodiments, the pulley 305 can be integral to the flywheel 310. FIG. 6 illustrates the gearbox 220 and clutch 230 in more detail. In addition, the connection between PTO assembly 250 and clutch 230 is shown. A plurality of fasteners 290 fix a plate 292 attached to a portion of the universal joint 232 to the clutch 230. It should be appreciated that the PTO assembly 250 can be removed from the utility vehicle 100 by removing the fasteners 290 from the clutch and removing fasteners 252 (shown in FIG. 7) to remove housing 245 from the undercarriage 116. This advantageously allows for removal of the PTO assembly 250 while leaving the drive components (that is, clutch 230 and gearbox 220) on the machine. Removing the PTO assembly 250 provides additional ground clearance, which may be desirable.

Figure 7:
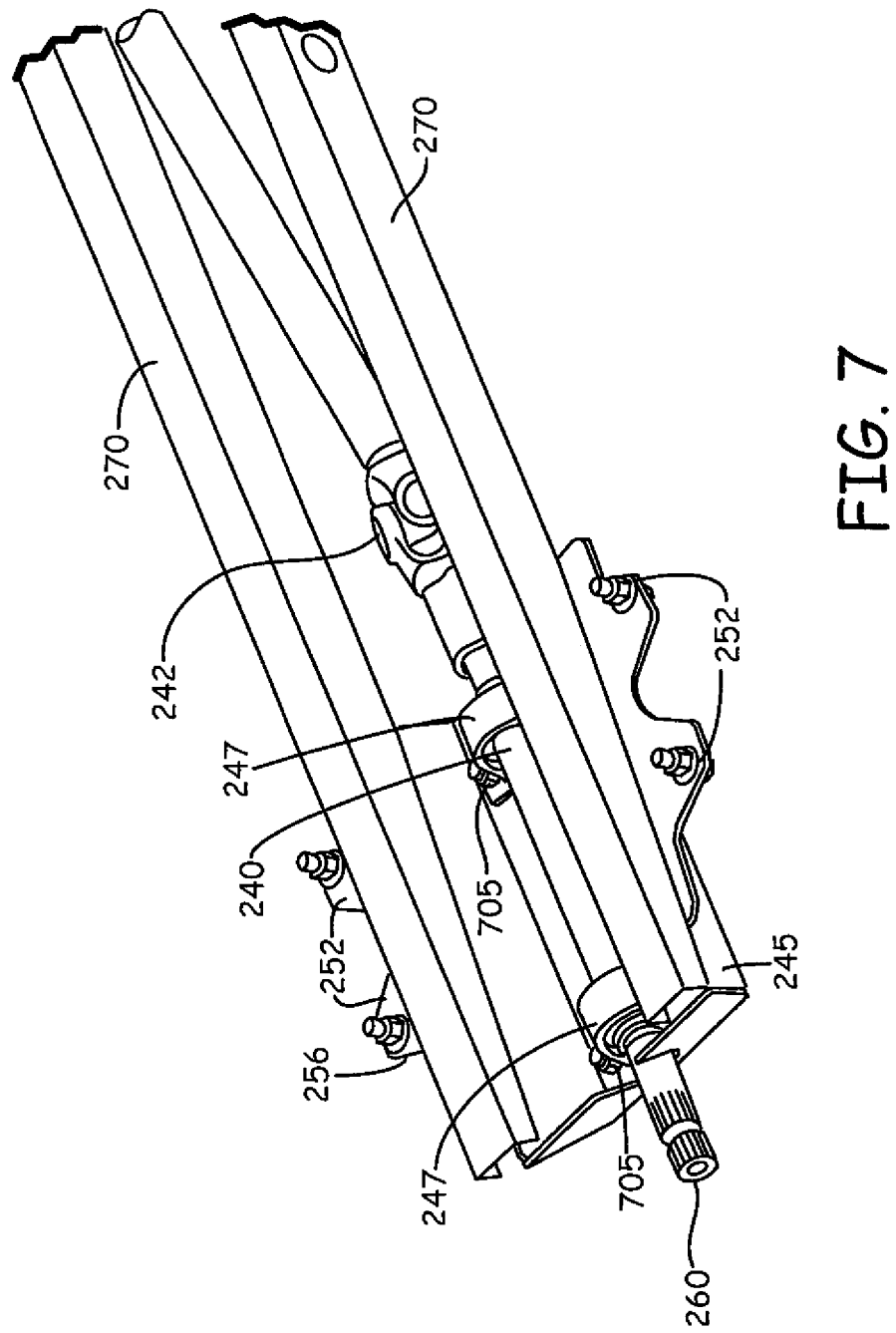

Referring now to FIG. 7, shown in greater detail is housing 245 that is bolted via fasteners 252 to the undercarriage 116 of the utility vehicle 100. The housing 245 has the pair of pillow bearings 247 that accept the second portion 240 of the drive shaft and secure it to the housing with fasteners 705. The other features illustrated in FIG. 7 function as discussed above with reference to FIG. 2.

Figure 8:
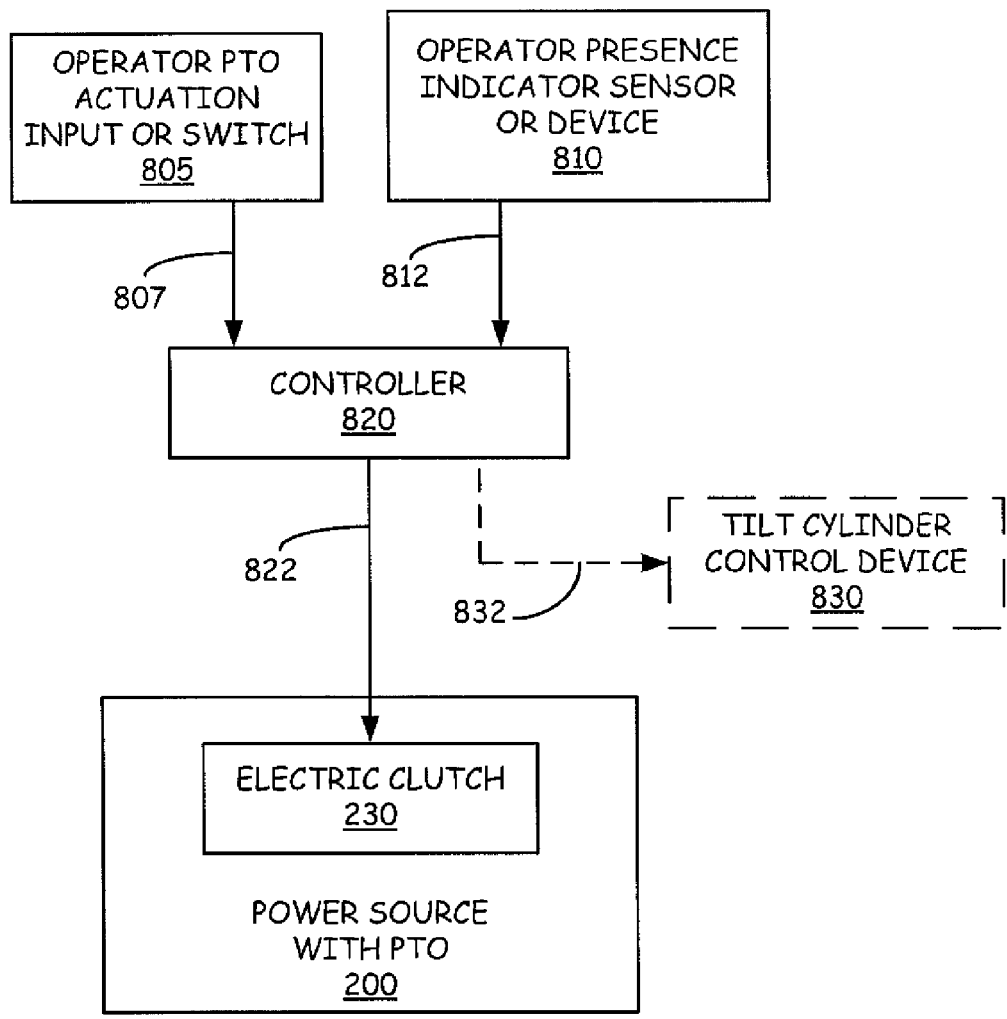
FIG. 8 is a block diagram illustrating a PTO control system in accordance with example embodiments.

Referring now to FIG. 8, shown is a PTO control system 800 in accordance with exemplary embodiments. As discussed above, the PTO functions of power source 200 are engaged and disengaged by an electric clutch 230. An operator PTO actuation input device 805, for example in the form of a switch, is typically positioned inside of operator compartment 122 to allow the operator of utility vehicle 100 to engage and disengage operation of the PTO while the operator is positioned in the operator compartment. Switch 805 provides a signal 807 which is either an engage signal or a disengage signal depending on the position of the switch. Signal 807 is provided to a logic device, for example in the form of a machine controller 820 or other suitable logic device. Controller 820 generates, partially in response to the engage/disengage status of signal 807, an engage/disengage signal 822 which is provided to electric clutch 230, or to an associated device which controls clutch 230, to control the PTO function. In accordance with some disclosed embodiments, controller 820 only provides an engage signal to the clutch 230 when certain conditions are met.

In an exemplary embodiment, system 800 also includes an operator presence indicator device or sensor 810 which provides a signal 812 to controller 820 which is indicative of whether the operator is positioned within operator compartment 122. It is desirable to have the PTO operate only when there is an operator is in the operator compartment. In one embodiment, sensor 810 is a seat switch or sensor. When the seat sensor provides no indication of the presence of an operator, the controller 820 or other logic device provides at output 822 a disengage signal to the clutch, regardless of the signal provided by the PTO actuation input 805.

In some exemplary embodiments, when the controller provides a disengage signal to the clutch because of the absence of a signal from the seat switch or operator presence detecting sensor 810, the operator must sit in the seat to change the status of signal 812, and then move the PTO actuation input 805 from a disengage position to an engage position. Thus, in conditions where the controller 820 changes the output signal 822 from actuation to de-actuation because the seat switch 810 provides an absent signal, the operator must cycle the PTO actuation input 805 from an engaged position to a disengaged position, and then back to an engaged position (while sitting in the seat) for controller 820 to provide an actuation signal to the clutch.

Figure 9:
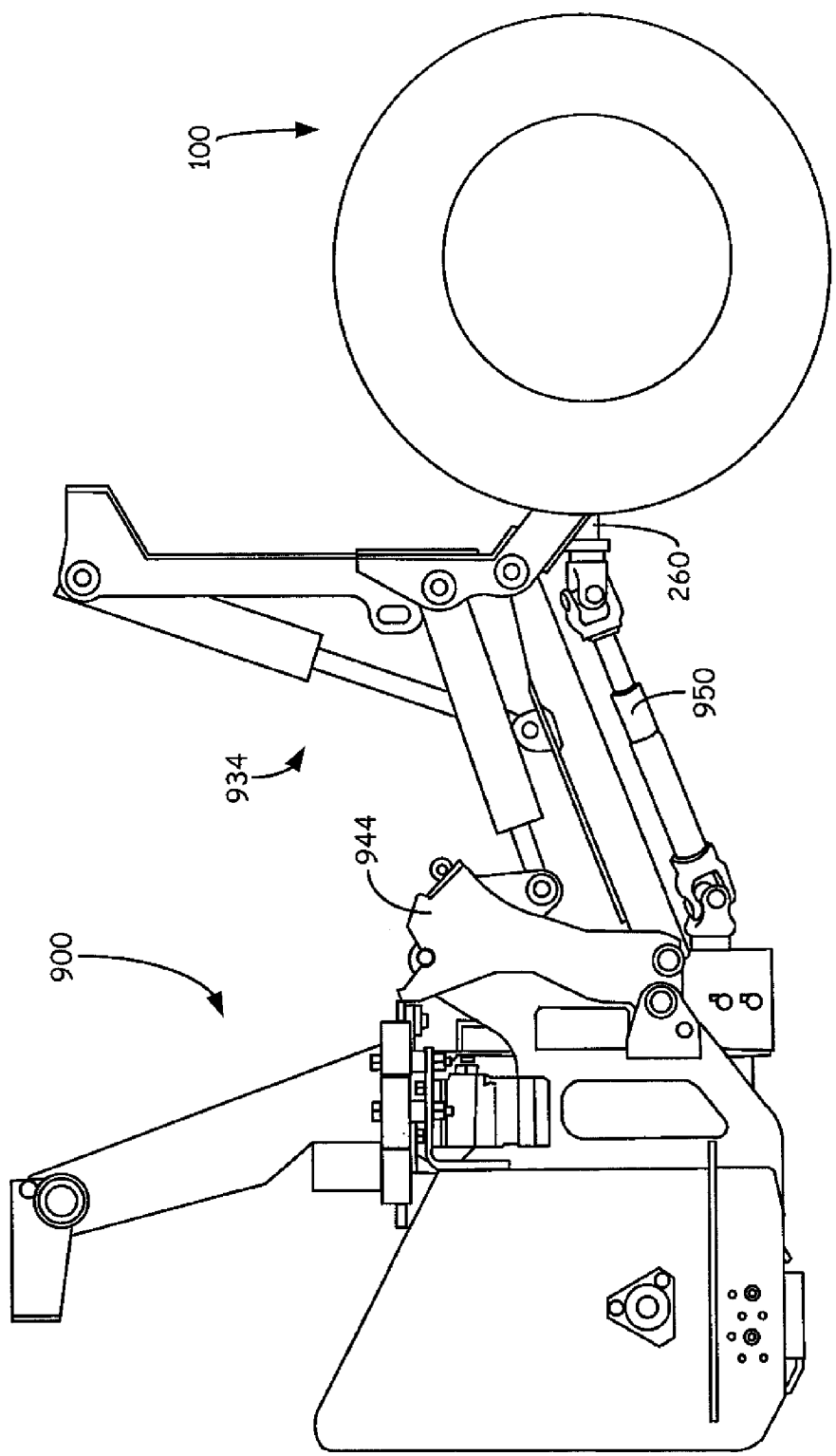
FIG. 9 illustrates an implement attached to an implement carrier and a front PTO of a utility vehicle according to one illustrative embodiment.

FIG. 9 illustrates an implement 900 in the form of a snow blower attached to an implement carrier 944, which is in turn pivotally coupled to a lift arm assembly 934. The implement carrier 944 and lift arm assembly 934 are generally similar to the implement carrier 144 lift arm assembly 134 discussed above, although they may have some structural differences. A PTO coupler 950 is operably coupled to the PTO interface 260 of utility vehicle 100. The PTO coupler 950 as shown is of variable length to accommodate movement of the lift arm assembly 934 and the implement carrier 944 and has a pair of universal joints, which also accommodate movement of the lift arm assembly and implement carrier. The implement 900 is representative of the various types of implements that can be coupled to the utility vehicle 100 via implement carrier 944.

The PTO assembly and various related components described above provide many important advantages. The PTO assembly is easily removed or added to a utility vehicle and the shaft arrangement allows for a placement of the gearbox above the rails, thereby providing adequate ground clearance either when the PTO assembly is attached or removed from the utility vehicle. Another important advantage is coupling the drive pulley to the flywheel to provide a compact package in a vehicle where space utilization is an important consideration.

Although the subject matter has been described in language specific to structural features and/or methodological acts, it is to be understood that the concepts disclosed herein are not limited to the specific embodiments described. Rather, the specific features and acts described above are disclosed as example forms. For example, in various embodiments, different types of power machines can include the front PTO system configuration and control systems. Other examples of modifications of the disclosed concepts are also possible, without departing from the scope of the disclosed concepts.

What is claimed is:

1. A power system in a power machine, comprising:
   an engine capable of powering a rotatable engine output shaft;
   a hydraulic pump assembly positioned in-line with and powered by the engine output shaft;
   a gearbox having a gearbox drive shaft to drive the gearbox, the gearbox providing a gearbox output;
   a driving member powered by the engine having a central cavity through which access to the engine output shaft is provided to the hydraulic pump;
   a driven member in communication with the driving member to receive power, the driven member being coupleable to the gearbox drive shaft; and
   a power take-off (PTO) shaft capable of being driven by the gearbox output.

2. The power system of claim 1, wherein the driving member is coupled to a flywheel on the engine.

3. The power system of claim 1, wherein the driving member is integrated with a flywheel on the engine.

4. The power system of claim 1, wherein the driving member and the driven member are first and second pulleys, respectively, and further comprising:
   a belt engaging the first and second pulleys so that the rotation of the engine output shaft is capable of causing rotation of the gearbox drive shaft to drive the gearbox.

5. The power system of claim 1, wherein the PTO shaft extends from a forward end of the power machine.

6. The power system of claim 1, wherein the PTO shaft includes a first shaft portion coupleable to the gearbox output through a first universal joint, and a second shaft portion coupled to the first shaft portion through a second universal joint.

7. The power system of claim 6, wherein the PTO shaft includes a PTO interface adapted to be coupled to an implement at an end of the second shaft portion.

8. The power system of claim 7, and further comprising a frame rail mounted below the engine wherein the second shaft portion is oriented generally parallel with at least a portion of the frame rail, and wherein the first shaft portion is oriented to descend from the gearbox output to the second shaft portion.

9. The power system of claim 8, and further comprising:
a carrier having a housing mounted to an undercarriage of the power machine, wherein the second shaft portion is coupled to the housing by at least one bearing.

10. The power system of claim 1, wherein the PTO shaft includes a PTO interface oriented such that the PTO interface is offset from the gearbox output.

11. The power system of claim 1 and further comprising:
a clutch configured to be selectively energized and de-energized, the clutch being positioned between one of the engine and the driving member, the driven member and the gearbox, and the gearbox and the PTO shaft.

12. A power system in a power machine, the power system providing the power machine with a front power take-off (PTO), the power system comprising:
an engine having an engine output shaft;
a gearbox operably coupled to the engine output shaft to drive the gearbox, the gearbox providing a gearbox output; and
a PTO shaft capable of being coupled to and driven by the gearbox output, wherein the PTO shaft has a PTO interface that is offset from the gearbox output; and
a variable length PTO coupler coupling the PTO interface to an implement carrier of the power machine.

13. The power system of claim 12, wherein the PTO shaft includes a first shaft portion operably coupleable to the gearbox output through a first universal joint, and a second shaft portion coupled to the first shaft portion through a second universal joint.

14. The power system of claim 13, wherein the PTO interface is at an end of the second shaft portion.

15. The power system of claim 14, and further comprising:
a frame rail mounted below the engine, wherein the first shaft portion is oriented to descend from a clutch to the second shaft portion, which is positioned generally parallel with the frame rail.

16. The power system of claim 15, and further comprising:
a carrier having a housing mounted to an undercarriage of the power machine, wherein the second shaft portion is coupled to the housing by a bearing.

17. A power system in a power machine, the power system providing the power machine with a front power take-off (PTO), the power system comprising:
an engine having an engine output shaft;
a gearbox operably coupled to the engine output shaft to drive the gearbox, the gearbox providing a gearbox output; and
a hydraulic pump assembly positioned in-line with and coupled to the engine output shaft;
a first pulley fixedly operably coupled to the engine and having a central cavity through which the engine output shaft is coupled to the hydraulic pump; and
a second pulley attached to a gearbox drive shaft and driven by the first pulley.

18. A power system in a power machine, the power system providing the power machine with a front power take-off (PTO), the power system comprising:
an engine having an engine output shaft;
a gearbox operably coupled to the engine output shaft to drive the gearbox, the gearbox providing a gearbox output; and
a PTO shaft capable of being coupled to and driven by the gearbox output, wherein the PTO shaft includes a first shaft portion operably coupleable to the gearbox output through a first universal joint, and a second shaft portion coupled to the first shaft through a second universal joint; and
a frame rail mounted below the engine, wherein the first shaft portion is oriented to descend to the second shaft portion, which is positioned generally parallel with the frame rail.

\* \* \* \* \*